Jan. 3, 1933.  O. B. GOLDKAMP  1,892,883
FLUID PRESSURE CONTROLLING MEANS
Filed Nov. 21, 1928  3 Sheets-Sheet 2
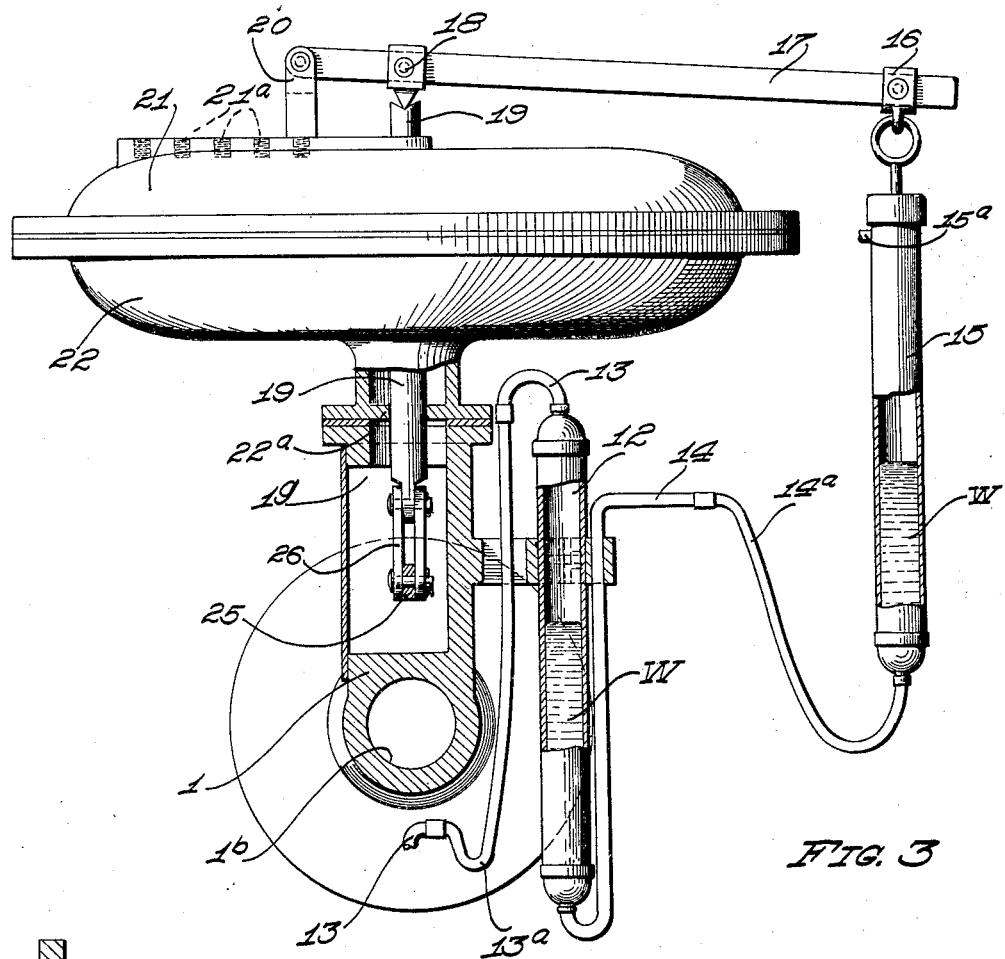
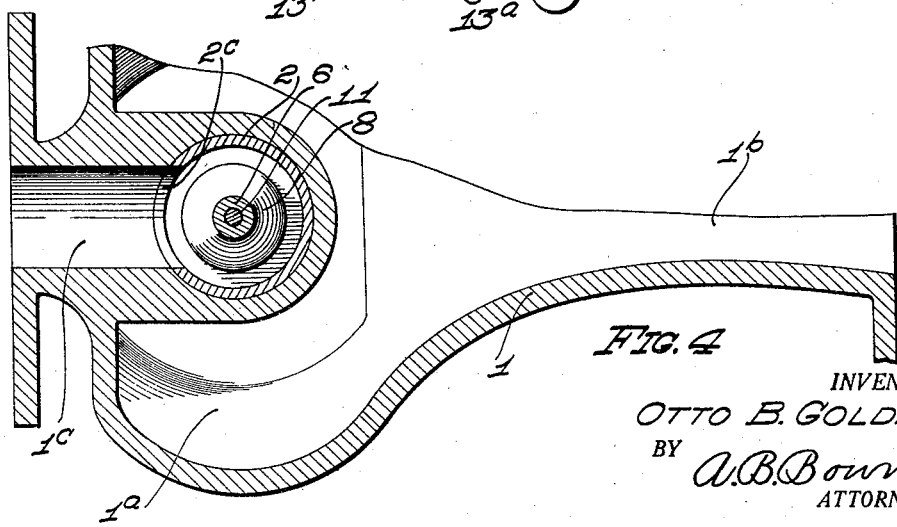
INVENTOR.
OTTO B. GOLDKAMP
BY
A. B. Bowman
ATTORNEY Jan. 3, 1933.   O. B. GOLDKAMP   1,892,883
FLUID PRESSURE CONTROLLING MEANS
Filed Nov. 21, 1928   3 Sheets-Sheet 3
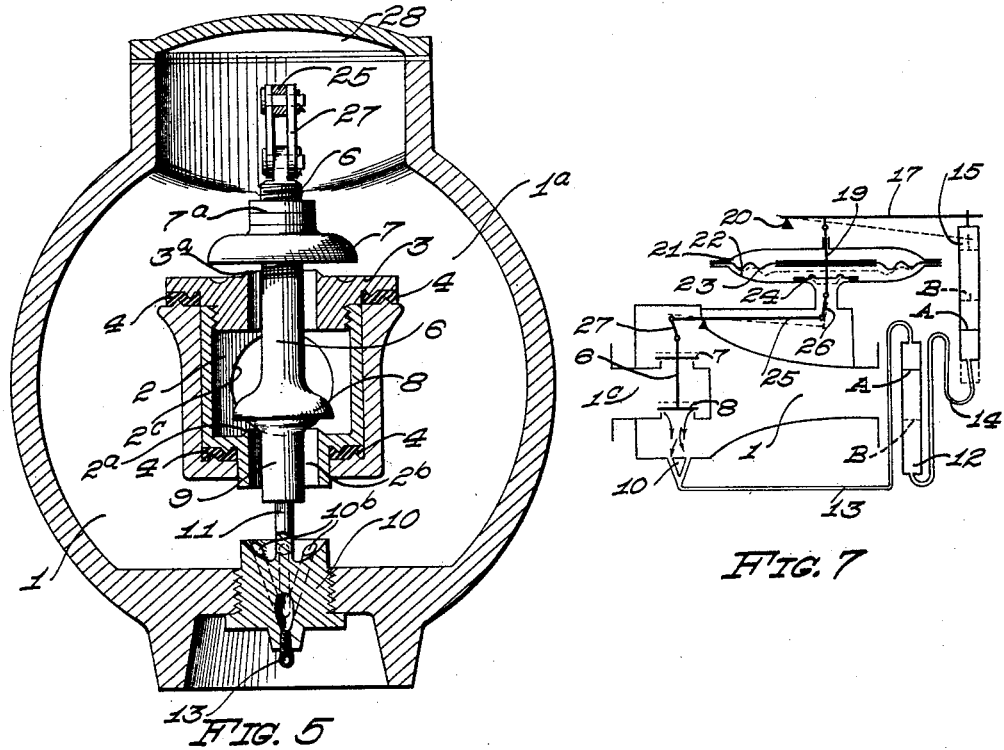
INVENTOR.
OTTO B. GOLDKAMP
BY A. B. Bowman
ATTORNEY Patented Jan. 3, 1933

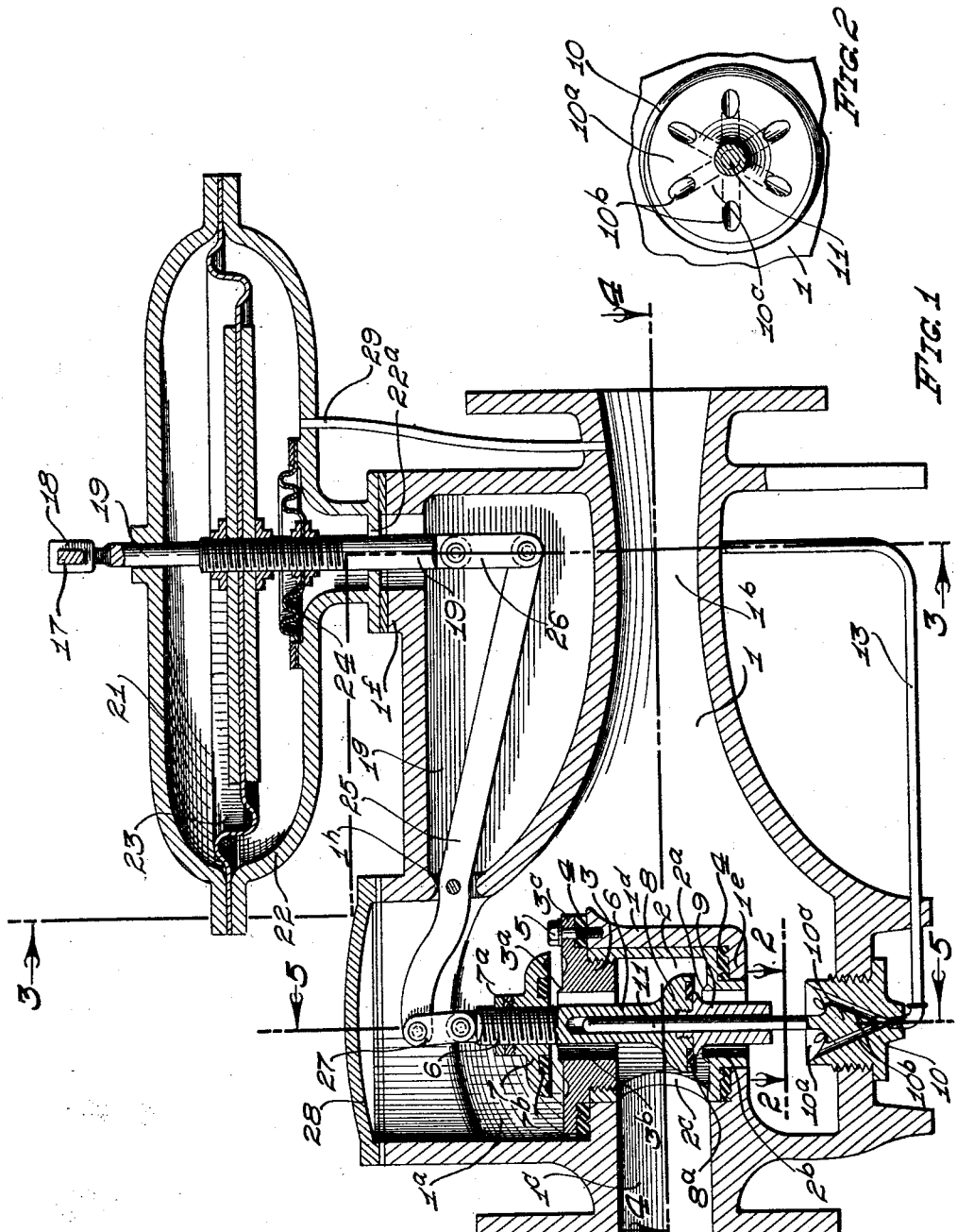

1,892,883

UNITED STATES PATENT OFFICE

OTTO B. GOLDKAMP, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA

FLUID PRESSURE CONTROLLING MEANS

Application filed November 21, 1928. Serial No. 320,791.

My invention relates to pressure controlling means and the objects of my invention are: first, to provide a means of this class which maintains a substantially constant pressure in a fluid pipe although the volume of fluid passing therethrough varies greatly; second, to provide a means of this class in which increased demand upon a pipe line automatically opens a valve therein while a reduction in demand closes said valve; third, to provide a means of this class which reduces the peak and off peak strains, thereby permitting the use of a pipe having a relatively low factor of safety; fourth, to provide a means of this class which operates by reason of the laws that the impact pressure is directly proportional to the velocity of a fluid and that the velocity is directly proportional to the demand or rate of discharge, thus by suitable linking means a valve may be caused to open with increased velocity of the fluid and caused to close with a reduction in velocity thereof; fifth, to provide a means of this class which by proper adjustment causes an increase in the pressure upon fluid in a pipe system connected with the outlet side of said means with an increase in demand, and a decrease in the pressure with a decrease in demand; in other words, to provide a means of this class which causes the pressure in a pipe system to vary in direct proportion to the demand upon said system, thus, as there is always considerable leakage in a pipe system of any extent, and leakage is directly proportional as the square root of the pressure within the pipe system, it is possible to save large quantities of fluid by reason of the lowering of the pressure as demand is decreased; sixth, to provide a means of this class in which the valve mechanism may be easily removed as a unit, thereby permitting accurate adjustment at a central shop equipped for such work; seventh, to provide a means of this class in which the pressure is controlled by a self contained system, no other energy than that coming by the passage of fluid being necessary to operate the pressure controlling valve, and eighth, to provide a means for regulating the pressure of a pipe line which is simple of construction, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view through my pressure controlling means with parts and portions shown in elevation to facilitate the illustration; Fig. 2 is an enlarged sectional view through 2—2 of Fig. 1 showing the gathering head; Fig. 3 is a transverse sectional view through 3—3 of Fig. 1 with parts and portions shown in elevation to facilitate the illustration; Fig. 4 is a fragmentary longitudinal sectional view at right angles to Fig. 1 taken through 4—4 thereof; Fig. 5 is another transverse sectional view through 5—5 of Fig. 1 with parts and portions shown in elevation to facilitate the illustration; Fig. 6 is a fragmentary sectional view similar to Fig. 3 showing a slight modification; and Fig. 7 is a diagrammatic view of my valve controlling means for illustrating the operation thereof.

Similar characters of reference refer to similar parts and portions throughout the several views of the drawings.

Valve housing 1, sleeve member 2, upper valve seat member 3, gaskets 4, screws 5, valve rod 6, upper valve 7, lower valve 8, choke sleeve 9, gathering head member 10, valve guide 11, secured weight reservoir 12, pipe line 13, pipe line 14, sleeve container member 15, sleeve container member support 16, lever member 17, slide bar 18, diaphragm rod 19, fulcrum member 20, diaphragm housings 21 and 22, diaphragms 23 and 24, lever mechanism 25, link members 26 and 27, inspection plate 28, drain pipe 29, constitute the principal parts and portions of the one form of my pressure and controlling regulator.

Reservoir 30, support 31, container 32, connecting pipe 33, constitute the modified portions of my pressure regulator.

The valve housing 1 is provided with a globular portion 1a near the intake end thereof, while the discharge end 1b is constricted, as shown in Figs. 1, 4 and 5 of the drawings. At the intake end fluids enter through a passage 1c having substantially the diameter of the pipe line in which the valve is mounted.

The passage 1c intersects a valve mechanism support 1d which projects into the globular portion 1a and which has a cylindrical opening therethrough extending at right angles and vertically relative to the passage 1c. The lower end of the opening in said valve mechanism support is constricted as indicated in Fig. 1. Mounted in this cylindrical portion is a sleeve portion 2, the lower portion of which rests upon the flange 1e formed by the constricted portion of the opening in the valve mechanism support. This lower portion of the sleeve 2 forms a valve seat 2a around a passage 2b, as shown best in Figs. 1 and 5 of the drawings. Between the sleeve 2 and the flange 1e is positioned a gasket 4. The sleeve 2 is provided with an opening 2c which communicates with the passage 1c.

The upper end of the sleeve 2 is internally threaded and receives an upper valve seat member 3 having a valve seat portion 3a on its upper surface which surrounds a passage 3b which communicates with the interior of the sleeve 2, as shown in Figs. 1 and 5. The upper valve seat member 3 is provided with an outwardly extending flange 3c which overlaps the upper portion of the valve mechanism support 1d. A gasket 4 is positioned between the flange 3c and the upper surface of the valve mechanism support 1d and the whole valve mechanism is held in rigid relation to the support 1d by means of screws 5 extending through said flange.

Extending through the passage 3b is a valve rod 6 upon which is screwably mounted an upper valve 7 which may be locked relative to the valve rod by suitable locking means 7a. On the under side of the valve 7 is an annular seating portion 7b preferably made of resilient material or at least a softer material than the other portions of the valve and is adapted to engage the valve seat 3a.

The lower end of the valve rod 6 terminates in a lower valve 8 which is preferably made integral therewith, as shown in Figs. 1 and 5. Similar to the construction of the upper valve 7, the lower valve 8 has an annular valve seating portion 8a which is adapted to rest upon the valve seat 2a. Secured to the under side of the lower valve 8 is a choke sleeve 9 which closes the passage 2b until it is substantially the same size as the opening between the valve rod 6 and the passage 3b.

It will be noted that the upper valve 7 although adapted to close the same sized passage as the lower valve 8, is made substantially larger so that the impact of fluid passing through the two valves would tend to lift them off their seats rather than press them down, thus facilitating the action of the valves.

Mounted below and in alinement with the axis of the two valves 7 and 8 is a gathering head 10. The gathering head 10 consists of an externally threaded plug having a dished or concave upper surface 10a. A plurality of passages 10b intersect the upper surface 10a of the gathering head in spaced relation to each other, as shown best in Fig. 2. The passages 10b extend downwardly, converge towards a common axis, and intersect each other near the lower portion of the gathering head, as shown in Figs. 1, 2 and 5.

Extending upwardly from the gathering head 10 is a valve guide 11 which passes through the sleeve 9 and into the valve rod 6 which is made hollow to receive the guide. The guide 11 is preferably integral with the gathering head or may be screwably mounted in the spider portion 10c formed by the arrangement of the passages 10b.

Mounted at one side of the valve housing 1 is a weight reservoir 12. The weight reservoir 12 is secured by any suitable means 12a which permits a vertical adjustment thereof. A pipe line 13 connects the upper end of the reservoir 12 with the gathering head 10, as shown in Figs. 1 and 3 of the drawings. A portion 13a of the pipe line is made flexible so as to permit the adjustment of the weight reservoir.

The weight reservoir 12 is connected to another pipe line 14, a portion 14a of which is flexible, to a weight container member 15. This container member 15 is similar in size and shape to the reservoir 12.

Mercury or other heavy liquid W which will not react with the regulated fluid is placed in the reservoir 12. This liquid is adapted to pass in varying amounts into the container 15, depending upon the pressure in the pipe line 13 and the relative positions of the reservoir and container.

The weight container member 15 is secured to a lever 17 by means of an adjustable support 16, as shown in Fig. 3. Intermediate the ends of the lever 17 is a slide bar 18 which is adapted to rest on the upper edge of a diaphragm rod 19 and exert a pressure thereon. The end of the lever 17 opposite from the support 16 is connected to a fulcrum member 20 which projects from the upper side of a diaphragm housing 21. The diaphragm housing 21 is provided on its upper surface with a plurality of internally threaded holes 21a each of which is adapted to receive the fulcrum member 20, thereby permitting adjustment of the position of the lever 17.

The diaphragm housing 21 forms a cap for a second diaphragm housing 22. This second or lower diaphragm housing 22 rests upon an extended portion 1f of the valve chamber, this extended portion being separated from the passages 1a and 1b thereof forming the fluid passage. Clamped between the two diaphragm housing members by its marginal portion is a diaphragm member 23. The diaphragm rod 19 extends through and is secured to the central portion of the diaphragm member 23. The diaphragm rod 19 also passes through a second diaphragm member 24, mounted upon the lower housing 22 beneath the diaphragm member 23, as shown in Fig. 1.

The diaphragm rod 19 extends through the lower housing 22 into a chamber 1g formed in the extended portion 1f on the upper side of the valve housing 1, as shown best in Figs. 1 and 3 of the drawings. The lower portion 22a of the lower diaphragm housing member 22 forms a guide for the diaphragm rod 19. A slot 1h communicates between the chamber 1g and the globular portion 1a of the valve housing. Pivoted intermediate its ends, preferably in the slot 1h, is a lever 25 which is connected at its one end through link members 26 to the lower end of the diaphragm rod 19 and by its other extended end through link members 27 to the upper end of the valve rod 6, as shown in Fig. 1. Thus reciprocal movement of the diaphragm rod 19 causes a corresponding reciprocal movement in the valve rod 6.

The globular portion 1a of the valve housing immediately above the valve mechanism is extended and covered with an inspection plate 28 which permits ready access to the valve mechanism for its removal, inspection, or replacement.

As the movement of the two diaphragms 23 and 24 causes a variation in the space below the diaphragm 23, a pipe line 29 connects the lower diaphragm housing 22 with the discharge opening of the valve housing, as shown in Fig. 1.

In the modified structure shown in Fig. 6, a reservoir 30, supporting bracket 31, container 32, and connecting pipe 33, is substituted in place of the reservoir 12, pipe line 14, container 15, support 16, lever 17, slide bar 18, and fulcrum member 20, otherwise the two structures are similar.

The reservoir 30 is adjustably supported upon the bracket 31 which is secured to the housing 21. A container 32 is mounted upon the end of the diaphragm rod 19 and communicates with the reservoir 30 through a flexible connecting pipe 33. As in the first described structure, the reservoir 30 communicates with the gathering head 10 through the pipe line 13 and is filled with a heavy liquid W, such as mercury.

In the structure shown in Fig. 3 relatively small amounts of the mercury are necessary to operate the regulator, whereas in the structure shown in Fig. 6 the volume of heavy fluid is relatively great because the action on the diaphragm rod is direct. As in the case of the container 15, the container 32 has a vent 32a in its upper portion.

In both of the structures vents 15a and 32a are provided in the containers 15 and 32. These vents discharge to the atmosphere or back into the pipe line system what fluid may work through the weight liquid.

The operation of my regulator is as follows: The fluid to be regulated whether a gas or a liquid, passes through the two valves 7 and 8. That portion of the fluid passing through the valve 8 impinges on the upper surface 10a of the gathering head creating a pressure in the various ducts or passages 10b, thereby creating a pressure in the pipe line 13. This pressure in the pipe line 13 varies with the velocity of fluid coming through the valve 8. The varying pressure causes the level of the weighing liquid W in the reservoir 12 to pass through the pipe line 14 in varying amounts into the container 15. Fluctuation of the amount of weight liquid W in the container 15 actuates the lever 17 and consequently through the various levers and link members operates the valves 7 and 8. Thus when there is a large demand upon the pipe line the velocity through the regulator is relatively great causing an increased pressure in the pipe line 13 and consequently raising the valves, as indicated by dotted lines in Fig. 7, until a new point of equilibrium is reached. When there is no demand on the regulator the valves 7 and 8 are closed but as soon as demand is put on, the reduction pressure on the demand side of the regulator opens the valves and the regulation of the pressure of the passing fluid begins again.

In the modified structure the operation is the same as in the first described structure except that the weight of the liquid W acts directly upon the diaphragm rod 19. Thus in the modified structure considerably more liquid W is necessary.

It is seen that the regulator is capable of very accurate adjustment as the container 15 may be shifted on the lever 17 and the position of the lever 17 itself may be varied. All these various adjustable spaces permit the same type of regulator to be used with no structural change in pipe lines built for low pressure and pipe lines built for a relatively high pressure.

My method of regulating pressure in a pipe line consists in first directing moving fluid against a column of the same fluid, then conducting the pressure created by said column of fluid to a heavy liquid in a container causing said liquid to discharge in varying amounts from said container into a second container, then utilizing the varying weight of said second container resulting from the heavy liquid received thereby to actuate lever means connected with a valve.

Though I have shown and described a particular construction, combination and arrangement of parts and portions and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a fluid pressure regulator, a valve mechanism, means in conjunction with said valve mechanism positioned for receiving the impact of a portion of fluid issuing therefrom, means for converting the impact of said fluid into a fluctuating pressure force, a variable weight means varied by said fluctuating pressure force, and lever means operated by said variable weight means, said lever means operatively connected with said valve mechanism.

2. In a fluid pressure regulator, a valve mechanism, means positioned for receiving the impact of fluid issuing from said valve mechanism, a heavy fluid, a container therefor, a second container therefor, pipe means communicating between said containers and said impact receiving means, said impacting fluid adapted to shift said heavy fluid from the first container to the second, and link and lever means operatively connecting said second container with said valve mechanism.

3. In a fluid pressure regulator, a valve mechanism, means positioned for receiving the impact of fluid issuing from said valve mechanism, a container for a heavy fluid, a passage communicating between said container and said impact receiving means, a second container shiftable relative to said first container, a passage communicating between said containers for passing the fluid of said first container into said second container, said second container adapted to receive in fluctuating amounts heavy fluid from said first container, and link and lever means connected with said second container operated by the fluctuating weight of said second container, said link and lever means operatively connected with said valve mechanism.

4. In a fluid pressure regulator, a valve mechanism, means in conjunction with said valve mechanism positioned for receiving the impact of fluids issuing therefrom, a heavy liquid, said heavy liquid adapted to be shifted by the impact of said fluid, and link and lever means controlled by the shifting of said heavy liquid, said link and lever means operatively connected with said valve mechanism.

5. In a fluid pressure regulator, a valve mechanism, a gathering head positioned for receiving the impact of fluids issuing from said valve mechanism, a heavy liquid shiftable by the impact of said fluid, a link and lever means operatively connected to said valve mechanism, and a container for receiving said heavy liquid in amounts proportional to the impact force upon said gathering head, said container and the heavy liquid therein adapted to form a variable weight for operating said link and lever means.

6. In a fluid pressure regulator, a valve mechanism, a gathering head positioned for receiving the impact of fluids from said valve mechanism, a link and lever means operatively connected with said valve mechanism, and a heavy liquid forming a variable weight for controlling the movement of said link and lever means, said heavy liquid shiftable by the impact of said fluid.

7. In a fluid pressure regulator, a valve mechanism, a gathering head positioned for receiving the impact of fluids issuing from said valve mechanism, link and lever means operatively connected with said valve mechanism, and a weight means for operating said link and lever means, said weight means varied by the impact of said fluid.

8. In a fluid pressure regulator, a housing having an intake opening and a discharge opening, a pair of co-operating valves controlling said intake opening, a gathering head positioned to receive the impact pressure from fluids issuing from one of said valves, a link and lever means for simultaneously operating said valves, and a variable weight for operating said link and lever means, said weight varied by the fluctuation of pressure created by the impact of fluids upon said gathering head.

9. In a fluid pressure regulator, a housing having an intake opening and a discharge opening, a pair of co-operating valves controlling said intake opening, a gathering head adapted to receive the impact pressure from fluids issuing from one of said valves, a link and lever means for simultaneously operating said valves, a pair of containers, a passage communicating between said containers and said gathering head, and a heavy liquid partially filling said containers, said heavy liquid shiftable from the one container to the other by the fluctuation of the pressure created by the impact of fluids in said gathering head, said shiftable container connected with said link and lever means adapted with the fluid therein to form a variable weight for controlling the movement of said link and lever means.

10. In a fluid pressure regulator, a housing having an intake opening and a discharge opening, a pair of co-operating valves controlling said intake opening, a gathering head positioned to receive the impact pressure from fluids issuing from one of said valves, a link and lever means for simultaneously operating said valves, and a variable weight for operating said link and lever means, said weight varied by the fluctuation of pressure created by the impact of fluids upon said gathering head, the other of said valves adapted to assist the action of said link and lever means when opening said valve and retard the action thereof when closing said valve.

11. In a fluid pressure regulator, a housing having an intake opening and a discharge opening, a pair of co-operating valves controlling said intake opening, a gathering head adapted to receive the impact pressure from liquids issuing from one of said valves, a link and lever means for simultaneously operating said valves, a pair of containers, a passage communicating between said containers and said gathering head, and a heavy liquid partially filling said containers, said heavy liquid shiftable from the one container to the other by the fluctuation of the pressure created by the impact of fluids in said gathering head, said shiftable container connected with said link and lever means and adapted together with the fluid therein to form a variable weight for operating said link and lever means, the other of said valves adapted to assist the action of said link and lever means when opening said valve and retard the action thereof when closing said valve.

12. A gaseous fluid pressure regulator consisting of a valve mechanism, a gathering head means in conjunction with said valve mechanism positioned for receiving the impact of a portion of fluid issuing therefrom, means for converting the impact of said fluid into a fluctuating pressure force, a variable weight means varied by said fluctuating pressure force, and lever means operated by said variable weight means, said lever means operatively connected with said valve mechanism.

13. In a fluid pressure regulator, a housing having an intake opening and a discharge opening, a pair of cooperating valves controlling said intake opening, a fluid impact gathering head positioned to receive the variable impact pressure from fluids issuing directly from one of said valves, and means for converting the impact force of said fluids into an opening movement of said valves.

In testimony whereof, I have hereunto set my hand at San Diego, California this 10th day of November 1928.

OTTO B. GOLDKAMP.